United States Patent [19]

Crossman

[11] Patent Number: 4,543,377

[45] Date of Patent: Sep. 24, 1985

[54] POLYMER-FIBRE MIXTURE PROCESS

[75] Inventor: James A. Crossman, Sarnia, Canada

[73] Assignee: Polysar Limited, Ontario, Canada

[21] Appl. No.: 617,027

[22] Filed: Jun. 4, 1984

[51] Int. Cl.$^4$ ............................ C08K 7/02; B32B 5/02
[52] U.S. Cl. ........................................ 524/13; 524/27;
524/34; 524/39; 524/443; 524/452; 523/206;
523/207; 427/213.31
[58] Field of Search ............... 524/13, 27, 34, 443,
524/452, 492, 493, 494, 39; 523/206, 207;
427/213.31; 428/127

[56] References Cited

U.S. PATENT DOCUMENTS

| | | | |
|---|---|---|---|
| 3,697,364 | 10/1972 | Boustany et al. | 524/27 |
| 4,263,184 | 4/1981 | Leo et al. | 524/35 |
| 4,431,768 | 2/1984 | Wessling et al. | 524/547 |

*Primary Examiner*—John Kight
*Assistant Examiner*—Nathan M. Nutter
*Attorney, Agent, or Firm*—Stevens, Davis, Miller & Mosher

[57] ABSTRACT

A process is provided for the incorporation of fibrous material into a polymer wherein the fibrous material as a dispersion in water is added to a solution of the polymer which is being subjected to agitation, whereby the fibrous material transfers from the aqueous phase to the polymer solution, and the polymer-fibrous material mixture is recovered.

14 Claims, No Drawings

POLYMER-FIBRE MIXTURE PROCESS

BACKGROUND OF THE INVENTION

This invention is directed to a process for incorporating fibrous material into a polymer.

DESCRIPTION OF THE PRIOR ART

It is well known that polymers can be reinforced by the addition of particulate or fibrous fillers. It is also well known that it is difficult to obtain uniform dispersions of fibrous fillers in polymers when the incorporation method involves conventional mixing operations. U.S. Pat. No. 4,263,184 teaches homogeneous predispersed fibre compositions prepared by mixing a latex of a polymer with fibrous material to form a wetted fibre mixture and mixing a coagulant with the wetted fibre mixture.

SUMMARY OF THE INVENTION

The present invention is directed to a process for the incorporation of a fibrous material into an organic polymer which process comprises providing a solution of the polymer in an organic solvent in which the fibrous material is insoluble and which is essentially immiscible with water, providing a dispersion of the fibrous material in water, adding the aqueous dispersion of the fibrous material to the agitated solution of the polymer, agitating the mixture whereby the fibrous material transfers from the aqueous phase to the organic solvent phase, coagulating the mixture of polymer and fibrous material by contact with steam and/or hot water, and recovering and drying the polymer-fibrous material mixture.

DETAILED DESCRIPTION OF THE INVENTION

The organic polymers which may be used in the present invention include natural rubber, synthetic rubbery polymers and synthetic thermoplastic polymers which polymers are soluble in organic solvents. Suitable synthetic rubbery polymers include polymers of $C_4$–$C_6$ conjugated diolefins such as polybutadiene and polyisoprene, polymers comprising a major proportion of isobutylene such as isobutylene-isoprene polymers and the chlorinated and brominated isobutylene-isoprene polymers, polymers comprising a $C_4$–$C_6$ conjugated diolefin and a $C_8$–$C_{10}$ vinyl or vinylidene aromatic compound such as styrene-butadiene polymers, styrene-isoprene polymers, α-methylsytrene-butadiene polymers and vinyl toluene-butadiene polymers, polymers comprising a $C_4$–$C_6$ conjugated diolefin and a vinyl substituted nitrile compound such as butadiene-acrylonitrile polymers, butadiene-methacrylonitrile polymers, and isoprene-acrylonitrile polymers, polymers such as hydrogenated butadiene-acrylonitrile polymers and polymers comprising ethylene, a $C_3$–$C_6$ α-olefin and optionally a non-conjugated diene such as ethylene-propylene polymers, ethylene-propylene-non-conjugated diene polymers and chlorinated ethylene-propylene-non-conjugated diene polymers. Suitable synthetic thermoplastic polymers include polymethyl methacrylate and polymers comprising a major proportion of a $C_8$–$C_{10}$ vinyl or vinylidene aromatic compound such as polystyrene, polyalphamethylstyrene and polyparamethylstyrene. Such polymers are generally solid materials and, in the case of the synthetic rubbery polymers, have high molecular weights as represented by the Mooney viscosity which may be (ML 1+4 or ML 1+8 at 100° C. or 125° C.) from about 30 to about 90.

Suitable organic solvents for use in the present invention are those in which the organic polymer is soluble at temperatures below about 80° to 90° C. and which are essentially immiscible with water. Thus, suitable organic solvents include the $C_5$ to $C_8$ alkanes, such as pentane and hexane, benzene and the alkyl benzenes, cyclic hydrocarbons such as cyclopentane and cyclohexane and mixtures of the aforesaid, all of which are suitable for use with the predominantly hydrocarbon-containing organic polymers, and include polar or halogenated solvents such as methyl ethyl ketone, cyclohexanone and trichlorethane, and other solvents well known in the art.

The polymer is dissolved in the organic solvent by conventional means, the concentration of polymer may be from about 2 to about 20 weight percent.

The fibrous material which may be used in the present invention includes fibres of inorganic and organic materials. Suitable fibres of inorganic materials include glass fibres, asbestos and mineral wool. Suitable fibres of organic materials include polypropylene, nylon, polyester, cellulose, cellulose acetate, cotton, jute, aromatic polyamides, polymeric paraphenylene terephthalamide also known as aramid, polyacrylonitrile and the like. Such fibres are generally available and may be used as obtained. The aramid fibres may be obtained in the form of wet pulp and contain 40–60% of water and may be used as obtained. The fibrous material is preferably in the form of short, e.g. less than about 5 mm long, fibre which may or may not be fibrillated. The fibrous material is dispersed in water by addition under conditions of intense mixing. The dispersion needs to be agitated to maintain it as a dispersion before being added to the agitated solution of the polymer. The amount of fibrous material present in the dispersion is not critical and may be from about 0.2 to about 5 weight percent. Optionally, a small amount of a known emulsifier may be added to the dispersion of fibrous material in water.

The polymer solution is placed in a suitable container equipped with an agitator and at a temperature of from about 20° up to about 50° C., the agitator turned on and the aqueous dispersion of fibrous material is added to the agitated polymer solution and agitation continued for a time sufficient that a major proportion of the fibrous material transfers from the aqueous phase to the organic solvent phase.

It is most unexpected that the fibrous material should transfer from the aqueous phase to the organic solvent phase.

If water is immiscible with or not extensively soluble in the organic solvent, the water will separate from the organic solvent if agitation is stopped and may be separated from the mixture, in part or essentially completely. Such separation is not necessary in the process of the present invention.

The mixture of polymer and fibrous material is coagulated by contacting the mixture with steam and/or hot water, thereby causing the vaporization of the organic solvent. Such coagulation is well known in the art. The coagulated polymer-fibrous material is separated from the aqueous phase, recovered and dried by conventional means.

The quantity of fibrous material in the polymer may be from about 1 to about 50, preferably from about 1 to about 20, parts by weight of fibrous material per 100 parts by weight of polymer.

The polymer-fibrous material may be used in general applications for the polymer and especially where improved physical characteristics are required—the presence of the fibrous material in the polymer generally leads to an increase in one or more of the Young's modulus, hardness and stiffness for that polymer. Where the polymer is a thermoplastic polymer, it will generally be used without further treatment. Where the polymer is a rubbery polymer, it will generally be compounded and vulcanized, in the manner well known for such polymers. Such compounding will generally include the addition of other reinforcing agents such as carbon black, plasticizers, tackifiers, stabilizers and cure active agents and the compounded polymer will be vulcanized in the conventional manner such as by heating at elevated temperatures.

In the following examples, all parts are parts by weight unless otherwise expressed.

EXAMPLE 1

A polymer solution was prepared by dissolving about 49.6 g of bromobutyl rubber in about 260 g of hexane. This solution was heated to a temperature of about 38° C. and transferred to a 1 L container equipped with a mechanical agitator. The bromobutyl was a brominated isobutylene-isoprene polymer containing about 2 weight percent of bromine, about 1.5 weight percent of isoprene and the balance isobutylene. It had a Mooney (ML 1+4 at 125° C.) of about 50.

A dispersion of aramid fibre in water was prepared. The aramid fibre was KEVLAR ® fibre as a wet pulp having an average length of about 4 mm (merge number 6F 205) Canadian Standard Freeness of 450 to 575 and BET surface area of about 10 m$^2$/g, and contained about 60 weight percent of water. 1.2 g of fibre (dry weight) was added to 300 mL of water contained in a high speed mixer and the contents were mixed for about 1 minute at high speed.

The aqueous fibre dispersion was slowly added to the agitated polymer solution. As the fibre dispersion was added the fibre transferred from the aqueous phase to the polymer solution phase. On completion of the addition of the aqueous fibre dispersion agitation was continued for a further time of about 1 minute and then stopped. The mixture contained an aqueous layer and a polymer solution layer, the aqueous layer being essentially equal to the volume of water added and being essentially free of fibre.

The polymer solution layer was separated and coagulated by addition to a container equipped with an agitator and containing water at about 100° C. to which steam was also added. The coagulated polymer-fibre mixture was separated from the water phase, recovered and dried. Examination of the dry polymer-fibre mixture showed the fibre to be evenly dispersed throughout the polymer.

EXAMPLE 2

A solution of cis-1,4-polybutadiene in benzene was prepared containing about 45 g of polybutadiene as a 10.2 weight percent solution.

An aqueous dispersion of the aramid fibre of Example 1 in water, containing 2.25 g of fibre (dry weight) in 300 mL of water, as described in Example 1.

The fibre dispersion was added to the polymer solution at a temperature of about 25° C., as in Example 1. The fibre transferred to the polymer solution. On completion of the addition, only about 50% of the added water separated from the mixture. The polymer solution was coagulated, separated and dried as in Example 1 and yielded a polymer-fibre mixture having a uniform dispersion of the fibre throughout the polymer.

EXAMPLE 3

Example 2 was repeated with the exception that cyclohexane was used in place of benzene to prepare the polymer solution.

The recovered polymer-fibre mixture had a uniform dispersion of the fibre throughout the polymer.

EXAMPLE 4

Example 2 was repeated except that the polymer used was EPDM and the solvent was hexane. The EPDM contained about 60 weight percent of ethylene and about 4 weight percent of ethylidene norbornene and had a Mooney viscosity (ML 1+8 at 100° C.) of about 30.

The recovered polymer-fibre mixture had a uniform dispersion of the fibre throughout the polymer.

EXAMPLE 5

80 g of crystal polystyrene was dissolved in about 350 g of benzene. An aqueous dispersion of the aramid fibre in 400 mL of water was added to the polystyrene solution, as described in Example 2. The fibre transferred from the aqueous phase to the polymer solution. The polymer-fibre mixture was coagulated, recovered and dried as in Example 1 and the polymer-fibre mixture was found to contain a uniform dispersion of the fibre.

EXAMPLE 6

40 g of a butadiene-acrylonitrile polymer containing about 34 weight percent of acrylonitrile and having a Mooney viscosity (ML 1+4 at 100° C.) of about 50 was dissolved in 450 mL of methylethylketone. An aqueous dispersion of the aramid fibre was added to the polymer solution, coagulated and the polymer-fibre mixture recovered as in Example 1. The polymer-fibre mixture was found to contain a uniform dispersion of the fibre.

EXAMPLE 7

The polymer solution was a bromobutyl polymer dissolved in hexane and contained about 11.6 weight percent bromobutyl. The fibre dispersions were prepared and added to the polymer solution and the polymer was coagulated, recovered and dried as in Example 1. The fibres used were:
  chopped glass fibre, 3 mm length;
  polypropylene fibre, a fibre having a fibrillated appearance; and
  nylon fibre, 1 denier, 0.7 mm length.
All the fibres transferred to the polymer solution phase.

EXAMPLE 8

The polymer-fibre mixtures of Examples 1, 3, 4 and 6 were compounded, vulcanized and tested. For the mixture of Example 1, the compounding recipe was 100 parts by weight of bromobutyl rubber (additionally containing about 2.4 parts of fibre), 50 parts of carbon black, 3 parts of zinc oxide, 1 part of stearic acid, 1 part of tetramethylthiuram disulphide and 1.75 parts of sulphur; the compound was sheeted out and vulcanized by heating for 3.5 minutes at 160° C. For the mixture of Example 3, the compounding recipe was 100 parts by weight of polybutadiene (additionally containing about 5 parts of fibre), 60 parts of carbon black, 15 parts of naphthenic oil, 3 parts of zinc oxide, 2 parts of stearic acid, 0.9 parts of N-tert-butyl-2-benzothiazole sulphenamide and 1.5 parts of sulphur; the compound was sheeted out and vulcanized by heating for 9 minutes at 160° C. For the mixture of Example 4, the compounding recipe was 100 parts by weight of EPDM (additionally containing about 5 parts of fibre), 50 parts of carbon black, 10 parts of naphthenic oil, 5 parts of zinc oxide, 1 part of stearic acid, 0.5 parts of mercaptobenzothiazole, 1 part of tetramethylthiuram disulphide and 1.5 parts of sulphur; the compound was sheeted out and vulcanized by heating for 10 minutes at 160° C. For the mixture of Example 6, the compounding recipe was 100 parts by weight of butadiene-acrylonitrile polymer (additionally containing about 5 parts of fibre), 50 parts of carbon black, 5 parts of di-octyl phthalate, 3 parts of zinc oxide, 1 part of stearic acid, 1.75 parts of sulphur, 1.5 parts of benzothiazyl disulphide and 0.5 parts of tetramethylthiuram disulphide; the compound was sheeted out and vulcanized by heating for 4 minutes at 160° C. The vulcanizate properties are given in Table 1 together with properties for controls which contained no fibre, from which it is clear that the properties of the vulcanizates were improved when the fibre was present.

3. The process of claim 1 wherein the organic polymer is natural rubber.

4. The process of claim 1 wherein the organic polymer is a synthetic rubbery polymer selected from polymers of $C_4$–$C_6$ conjugated diolefins, polymers comprising a major proportion of isobutylene, polymers comprising a $C_4$–$C_6$ conjugated diolefin and a $C_8$–$C_{10}$ vinyl or vinylidene aromatic compound, polymers comprising a $C_4$–$C_6$ conjugated diolefin and a vinyl substituted nitrile compound, and polymers comprising ethylene, a $C_3$–$C_6$ $\alpha$-olefin and optionally a non-conjugated diene.

5. The process of claim 1 wherein the organic polymer is a synthetic thermoplastic polymer selected from polymethyl methacrylate and polymers comprising a major proportion of a $C_8$–$C_{10}$ vinyl or vinylidene aromatic compound.

6. The process of claim 1 in which the organic solvent is one in which the organic polymer is soluble at temperatures below about 80° to 90° C.

7. The process of claim 1 in which the fibrous material is selected from fibres of inorganic and organic materials.

8. The process of claim 7 in which fibres of inorganic materials are selected from glass fibres, asbestos and mineral wool.

9. The process of claim 7 in which fibres of organic

TABLE 1

| Sample Identification | Ex. 1 | Control | Ex. 3 | Control | Ex. 4 | Control | Ex. 6 | Control |
|---|---|---|---|---|---|---|---|---|
| 100% Modulus (MPa) | 3.4 | 1.3 | 6.3 | 1.4 | 7.2 | 3.0 | 12.2 | 3.0 |
| 300% Modulus (MPa) | 10.3 | 8.6 | 11.8 | 9.1 | 14.0 | 12.9 | 15.8 | 14.5 |
| Tensile Strength (MPa) | 13.9 | 19.8 | 14.3 | 15.5 | 20.1 | 17.6 | — | 20.7 |
| Elongation (%) | 400 | 560 | 340 | 420 | 380 | 370 | 290 | 450 |
| Young's Modulus (MPa) | 5.4 | 5.4 | 5.7 | 3.3 | 16.8 | 8.7 | 9.1 | 4.0 |

What is claimed is:

1. A process for the incorporation of a fibrous material into an organic polymer which process comprises providing a solution of the polymer in an organic solvent in which the fibrous material is insoluble and which is essentially immiscible with water, providing a dispersion of the fibrous material in water, adding the aqueous dispersion of the fibrous material to the agitated solution of the polymer, agitating the mixture whereby the fibrous material transfers from the aqueous phase to the organic solvent phase, coagulating the mixture of polymer and fibrous material from the organic solvent containing them by contact with steam and/or hot water, and recovering and drying the polymer-fibrous material mixture.

2. The process of claim 1 wherein the organic polymer is selected from natural rubber, synthetic rubbery polymers and synthetic thermoplastic polymers.

materials are fibres selected from polypropylene, nylon, polyester, cellulose, cellulose acetate, cotton, jute, aromatic polyamides, polymeric paraphenylene terephthalamide and polyacrylonitrile.

10. The process of claim 7 in which the fibrous material is less than about 5 mm fibre length and is dispersed in water under conditions of intense agitation.

11. The process of claim 1 wherein the temperature of the polymer solution is from about 20° to about 50° C.

12. The process of claim 1 in which the organic solvent is immiscible with water and the water present is partially removed prior to coagulating the mixture.

13. The process of claim 1 in which the amount of fibrous material in the polymer is from about 1 to about 50 parts by weight of fibrous material per 100 parts by weight of polymer.

14. The process of claim 1 in which the amount of fibrous material in the polymer is from about 1 to about 20 parts by weight of fibrous material per 100 parts by weight of polymer.

* * * * *